(No Model.)

J. G. HUNLOCK.
PLATE OR CONNECTOR FOR CONNECTING RAILROAD JOINTS.

No. 429,628. Patented June 10, 1890.

WITNESSES:
B. M. Espy
David C. Patrick

INVENTOR
John G. Hunlock

UNITED STATES PATENT OFFICE.

JOHN G. HUNLOCK, OF WYOMING, PENNSYLVANIA.

PLATE OR CONNECTOR FOR CONNECTING RAILROAD-JOINTS.

SPECIFICATION forming part of Letters Patent No. 429,628, dated June 10, 1890.

Application filed March 5, 1890. Serial No. 342,726. (No model.)

*To all whom it may concern:*

Be it known that I, JOHN G. HUNLOCK, a citizen of the United States, residing at Wyoming, in the county of Luzerne and State of Pennsylvania, have invented a new and useful Improvement in Plates or Connectors for Connecting Railroad-Rail Joints, of which the following is a specification.

The object of my invention is, first, to prevent the great and constant breakage of plates or connectors made without a spring. The main cause for breakage in plates made in any other way is from the contraction and expansion of the rails from the action of cold and heat upon the metal. This spring will open and close or lengthen and shorten as the rail contracts and expands, thereby preventing breakage; second, there is no necessity for making either in the rail or plate an elongated hole to permit longitudinal motion of the bolts of the joint, thereby obviating the detrimental strains brought on the bolts of a rail-joint, which is the case when the plates with elongated holes are used. It also reduces the liability of loose nuts, as the nuts on the bolts may be screwed up tight, thereby also dispensing with the use of nut-locks, as a sufficient looseness of the nuts to prevent the sliding of the plates during contraction and expansion is not necessary. I accomplish these objects by the method of constructing the plate or connector as illustrated in the accompanying drawings, in which—

Figure 1:
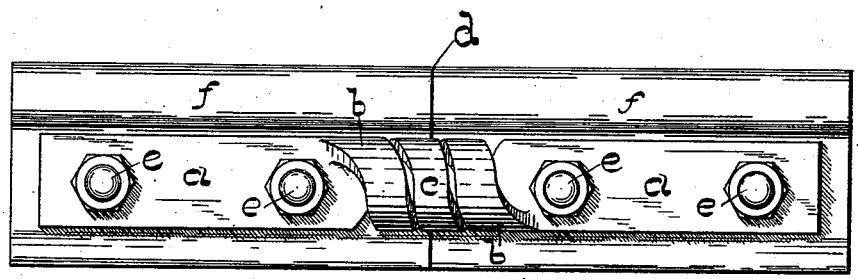
Figure 2:
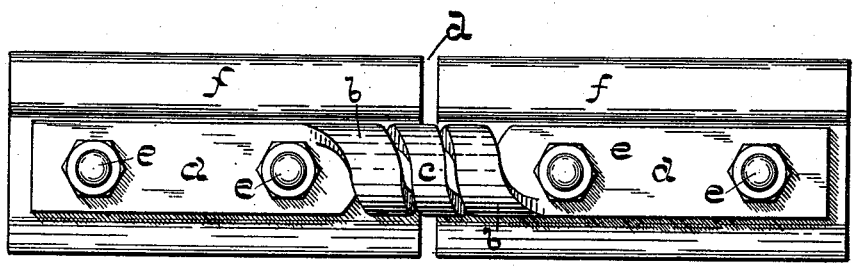
Figure 3:
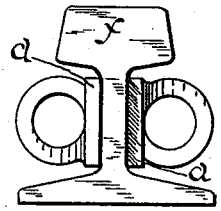

Figure 1 is a side view of the two ends of the rails at the joint with the plate in place, showing the condition of the joint when the rails are fully expanded. Fig. 2 is a side view of a similar joint, showing its condition when the rails have become somewhat contracted by a change of temperature or from other causes. Fig. 3 is an end view of the rail with plates in place, bolt-heads having been omitted.

Similar letters refer to similar parts throughout the specification.

$a$ and $a$ are the flat ends of the plate through which the bolts go, by which the plates are bolted to the rails.

$f$ and $f$ are the ends of the rails, to which are bolted the plates.

$b\ b$ and $c$ compose an intermediate part of the plate between the two ends or arms $a$, and are formed into a helix branching from $a$ at $b$ with an enlarged section. It is gradually reduced in section until at the point $c$ it has attained its smallest section. The object of this gradual reduction in section is to obtain a maximum elasticity in the central coil, where only a torsional or twisting strain is produced. In order to reduce the transverse or bending strain at the junction of $b$ with $a$, $e\ e\ e\ e$ are the bolts by which the plates are held in place.

$d$ indicates the opening between the ends of the rails.

It is obvious that in operation the contraction and expansion of the rail may be considerably increased by the use of this plate as compared with what may be obtained by the use of a plate with elongated holes, because with the use of this plate it is merely an alteration in the condition of the helical part, whereas by the use of a plate with elongated holes the contraction and expansion of the rails can only take place within certain limits beyond which shearing off of the bolts would occur and the joint become a source of danger. The spring being constructed, as is shown, so that the size of the coil is increased at the base where it joins the arms on either side and from there gradually lessened to a point farther up in the coil, the effect is to increase the strength of the spring where increased strength is needed and to equalize the strength of the entire spring. A spring made in any other way than as is here shown would be weaker at some points than at others, (especially so where the spring joins the arms or plates,) and would therefore break at the weakest point from the strain caused by the contraction of the rails.

Having fully described my invention, I claim and desire to secure by Letters Patent—

1. In a plate or connector for railroad-rail joints, two flat ends or arms connected by a spirally-constructed middle part, all of steel.

2. In a plate for railroad-rail joints, the combination of two flat ends jointed by a spirally-constructed middle part, the spiral part having an enlarged section at its junction with the flat ends and gradually reduced in section equidistantly from such junction.

3. In a plate for railroad-rail joints, two flat ends, in which are made "round" holes, through which pass the bolt $e$, a spirally-constructed middle part $b$ and $c$, having an enlarged section at junction with $a$, and a gradually-reduced section equidistant from $b$ $b$ $c$, in combination with the bolts $e$ $e$ $e$ $e$ and the rail end $f$.

JOHN G. HUNLOCK.

Witnesses:
B. M. ESPY,
G. M. MILLER.